United States Patent [19]

Jones et al.

[11] Patent Number: 5,029,199
[45] Date of Patent: Jul. 2, 1991

[54] DISTRIBUTED CONTROL AND STORAGE FOR A LARGE CAPACITY MESSAGING SYSTEM

[75] Inventors: Scott A. Jones, Cambridge; Donald P. Picard, Medford, both of Mass.

[73] Assignee: Boston Technology, Wakefield, Mass.

[21] Appl. No.: 393,270

[22] Filed: Aug. 10, 1989

[51] Int. Cl.⁵ ..................... H04M 3/50; H04Q 11/04
[52] U.S. Cl. .................................... 379/89; 370/60.1; 370/61; 379/269
[58] Field of Search ................... 379/89, 88, 67, 84, 379/269; 370/60, 60.1, 61, 62

[56] References Cited

U.S. PATENT DOCUMENTS

| | | | |
|---|---|---|---|
| 4,221,933 | 9/1980 | Cornell et al. | 379/89 X |
| 4,612,416 | 9/1986 | Emerson et al. | 379/88 |
| 4,761,807 | 8/1988 | Matthews et al. | 379/89 |
| 4,933,967 | 6/1990 | Lo et al. | 379/207 |
| 4,935,954 | 6/1990 | Thompson et al. | 379/89 |
| 4,955,054 | 9/1990 | Boyd, Jr. et al. | 379/269 |
| 4,972,462 | 11/1990 | Shibata | 379/89 |

OTHER PUBLICATIONS

Bell Atlantic Letter entitled "Bell Atlantic and Boston Technology Ink Agreement for Voice Messaging Equipment", (undated).
Article from Communications Week dated Nov. 14, 1988 entitled "Bell Atlantic Inks Voice Mail Deal".
Article from Voice Processing dated Nov. 15, 1988, vol. 7, No. 22 entitled "Bell Atlantic Picks Boston Technology".
Article from Voice Processing dated Sep. 15, 1988, vol. 7, No. 18.
Article from Communications Week dated Sep. 26, 1988 entitled Boston Technology, Nynex Ink Voice--Mail Pact.
Greg C. Carr, TE&M Special Report, "Voice Processing, Applications for the Central Office", Mar. 1, 1989.
Carol Wilson, "Telephony", *Who are these guys, anyway?*, Nov. 14, 1988.
Unisys, Network Applications Platform/open, 1990, 3 pages.
Voice Messaging Applications, Easily Add Residential and Business Voice Messaging to Your Network, Unisys Corp., 1989.
Network Applications Platform, Quickly Add New Services to your Existing Networks.[Unisys Corp.], (undated).
Unisys, Network Applications Platform, Technical Summary, pp. 1-21 (undated).
Voicetek Corp., VTK-300, Oct., 1990, 8 pages.

*Primary Examiner*—Thomas W. Brown
*Attorney, Agent, or Firm*—Staas & Halsey

[57] ABSTRACT

The present invention provides a distributed architecture that includes multiple voice processing unit each designated as a home unit for a subscriber's messages. An incoming call is preferentially switched to the home VPU by a digital switching system under the control of a master control unit. If a master control unit determines that all lines to the home unit are busy or the home unit is otherwise unavailable, the master unit causes the digital system to switch the call to another or remote voice processing unit. The remote unit then handles the call by either locally storing a message or retrieving a message from the home unit storage over an internal message bus. If a message is stored remotely and the home unit is processing the subscriber request, the home unit can access the remote message over the internal control bus or the master control unit can switch the call routing through the switching system to the remote unit for processing of the remote message and return the switching system routing to the home unit when finished with the remote message. Each voice processing unit stores both remote and home message locally on local disc storage units. The master control unit stores subscriber related information such as the home voice processing unit for each subscriber and the location of each message for that subscriber. Comunication between the master control unit and the voice processing units is over an internal network.

52 Claims, 8 Drawing Sheets

Microfiche Appendix Included
(1 Microfiche, 1510 Pages)

DISTRIBUTED CONTROL AND STORAGE FOR A LARGE CAPACITY MESSAGING SYSTEM

REFERENCE TO MICROFICHE APPENDIX

A microfiche appendix is incorporated herein by reference having 16 fiche and 1510 frames.

BACKGROUND OF THE INVENTION

1. Field of the Invention

The present invention is directed to a telephone communication system used for handling information such as messages, typically voice mail messages, and, more particularly, is directed to a system that provides a tightly coupled distributed architecture that allows substantially increased efficiency of equipment utilization, increased subscriber capability, modular expansion capability and low access blockage for subscribers and nonsubscribers.

2. Description of the Related Art

Typical voice mail systems are designed for operation in conjunction with a private business exchange (PBX). The typical systems include one or more separate call processing computers dedicated to serving a predetermined set of PBX lines and subscribers. Each processor stores the subscriber information for the subscribers assigned to that processor. The processors store messages in a common storage accessed over dedicated storage buses. Each call processor acts independently and competes for access to the common storage. Because each call processor serves a predetermined set of lines, when a message originator, whether a subscriber or non-subscriber, calls a subscriber and wishes to leave a voice message, if the lines dedicated to the subscriber are busy or if the call processing computer is unavailable for any other reason, the message originator is not allowed to leave a message. A processor does not have access to the subscriber information stored in another processor, thereby preventing other processors from handling the call. In like manner, if a subscriber wants to obtain his messages and the limited number of lines to the subscriber's dedicated call processing computer are busy or the processor is unavailable, the subscriber cannot get his messages. A prior art system as described above is typified by the system described in U.S. Pat. No. 4,371,752.

SUMMARY OF THE INVENTION

It is an object of the present invention to allow calls to be processed as long as any message processing unit is available.

It is another object of the present invention to allow any message processing unit to handle any incoming line and any subscriber.

It is an object of the invention to temporarily store a message in different portions of the system to improve performance.

It is a further object of the present invention to allow the system to store and retrieve any message no matter where stored in the system.

It is also an object to store a message permanently only once.

It is an object of the present invention to store subscriber information in a manner allowing any message processing unit to have access to that information to process the message.

It is an additional object of the present invention to prevent storage access bottlenecks.

It is an object of the invention to scale the system to very large sizes to handle information traffic for cities, states, national and world subscriber sets.

It is still another object of the present invention to provide a distributed architecture that prevents line blockage and prevents storage blockage.

It is an object of the present invention to provide an intercommunication system within the invention that handles both voice and data traffic.

It is still another object of the present invention to provide maximum availability of message processing units by freeing a voice processing unit to handle another call while the voice processing unit storing the message serves the subscriber with respect to that message.

It is an object of the present invention to increase the equipment utilization efficiency by algorithmically distributing calls to processing units.

It is another object of the present invention to allow access to any message through any voice part.

It is an object of the present invention to dynamically locate stored messages by algorithmically distributing messages among call processing units.

The above objects can be accomplished by a distributed architecture system that includes multiple message processing units, typically voice processing units. A voice processing unit (VPU) is designated as a home voice processing unit for a subscriber's messages. An incoming call or an access by a subscriber from a central office can be switched to the home VPU by a digital switching system (DSS) under the control of a master control unit (MCU). If the master control unit determines that all lines to the home voice processing unit are busy or the home voice processing unit is otherwise unavailable, the master control unit causes the digital switching system to switch the call to another or remote voice processing unit. The remote voice processing unit then handles the call by either locally storing a message or retrieving a message from the home voice processing unit storage or elsewhere in the system over an internal network. If a message is stored remotely and the home voice processing unit is processing a subscriber request, the home voice processing unit can access the remote message over the internal network or the master control unit can switch the call routing through the digital switching system to the remote voice processing unit for processing of the remote message by the remote processing unit. Once the remote message is processed the master control unit can return the digital switching system routing to the home voice processing unit or to another voice processing unit allowing the home voice processing unit or the other processing unit to continue processing messages stored in the home unit or in any other voice processing unit. Each voice processing unit stores both remote and home messages locally on local disc storage units. The master control unit can store subscriber related information such as the identification of the home voice processing unit for each subscriber and the location of each message for that subscriber. Communication between the master control unit and the voice processing units, and among the voice processing units is over the internal network. If out-dialing of the message is necessary, such a when a pager needs to be activated, the master control unit connects the voice processing unit storing the message, whether the home or remote unit, to the central office through the digital switch and the unit places the desired call. A hot standby master control unit is provided to take control of the system in the event that the primary master control unit fails.

These together with other objects and advantages which will be subsequently apparent, reside in the details of the construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is specifically designed for use with a telephone company central office or for a very large corporate user, however, an exchange such as private business exchange can take advantage of the high availability characteristics of the present invention in situations where high voice traffic exists, such as telephone shopping. The distributed architecture allows the system to be configured presently for up to 1536 voice channels, approximately 100,000 mailboxes and over 7,000 hours of voice storage. The architecture allows the present invention to simultaneously run multiple applications while keeping the underlying system totally transparent to the end user. The caller and/or subscriber can send, reply to or redirect messages at will irrespective of which processing unit stores particular messages or which processing unit is handling the call. The various computer programs executed within the distributed architecture are preferably written in the "C" programming language or Intel 386 assembly language and an appendix of the programs executed by the various processors within the distributed architecture is included herewith. Each processor in the distributed architecture is preferably using an operating system such as Xenix or Unix System V which allows multiple real time tasks.

Figure 1:
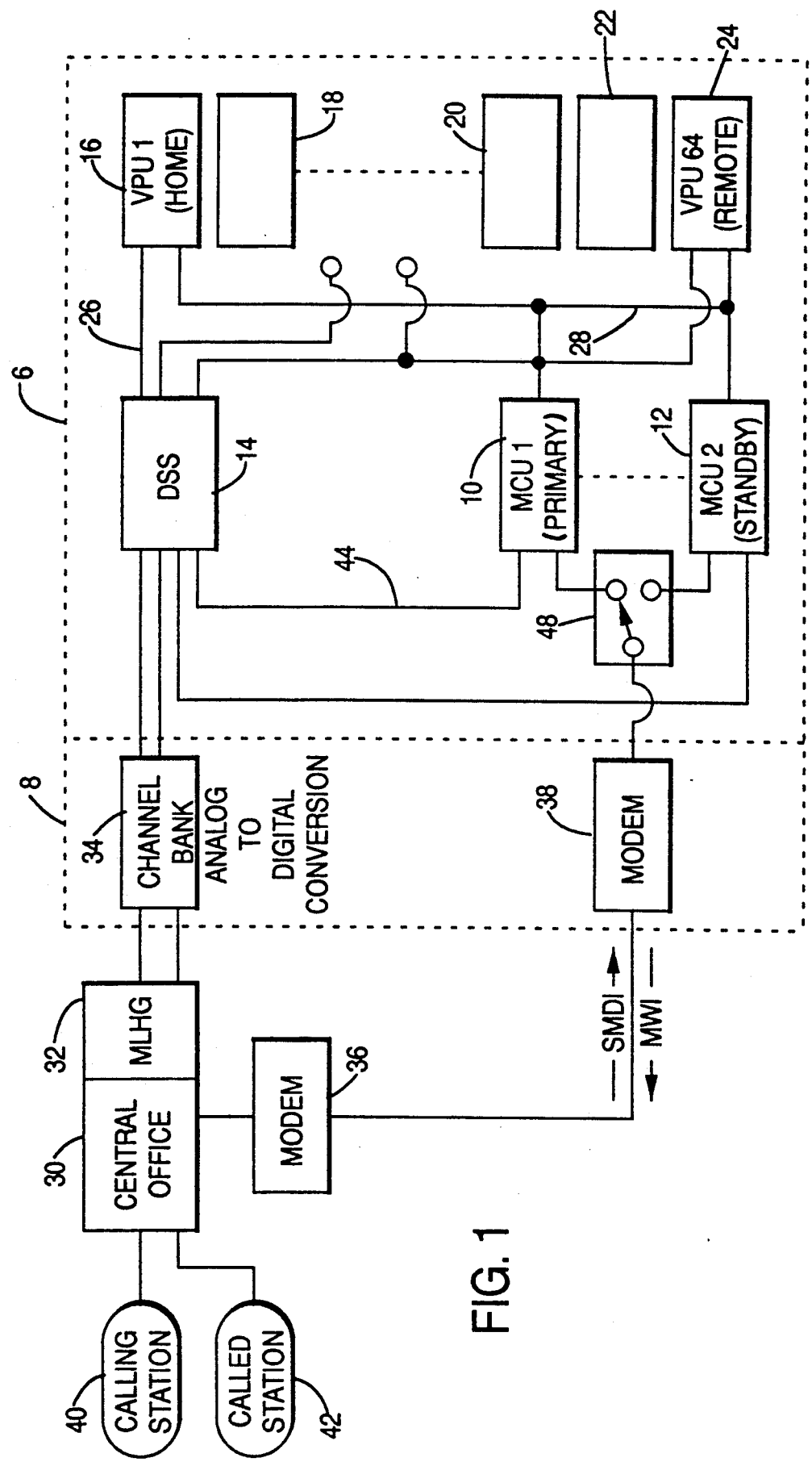
FIG. 1 illustrates the components of a system in accordance with the present invention.

The system 6 of the present invention, as illustrated in FIG. 1, includes both primary 10 and standby 12 master control units (MCU) which control switching by a digital sWitching system (DSS) 14. The MCU 10 coordinates the routing of calls, based on conventional Simplified Message Desk Interface (SMDI) information packets from a central office 30, through the DSS 14 to voice processing units 16-24. Up to 64 voice processing units can be provided in the system where each voice processing unit has a T1 termination for up to 24 voice ports 26 and is capable of storing up to 110 hours of voice storage for approximately 2,200 mailboxes.

Assignment of an incoming call by the MCU 10 to a VPU occurs over an internal bus or network 28 that includes both a data bus and a voice bus. This bus 28 rather than being a traditional bus can be a network of any topology such as a star or token ring. Control data and messages between the MCU 10 and VPUs or between the VPUs is routed over the data bus of the internal bus 28 while the voice messages are routed between the VPUs over the voice bus of the internal data bus 28. It is preferred that the internal bus 28 be a standard bus such as is provided by an Ethernet. The voice and data logical buses can be implemented as a single physical bus over the Ethernet or as separate Ethernets when interprocessor voice or data communication is high.

It is preferred that the digital switching system 14 be connected to a central office 30 through a multi-line hunt group (MLHG) 32. It is also preferred that a digital central office be used so that digital voice samples are passed between the central office 30 and the DSS 14. However, if the central office is an older switch such as an AT&T 1A-ESS, a channel bank 34 can optionally be provided in the optional telephone network interface circuitry 8 for converting incoming analog signals to digital packets. Communication between the MCU 10 and the central office 30 is optionally via conventional serial modems 36 and 38 preferably using the SMDI communication format, however, other formats such as SMSI can be used.

During operation when a subscriber or nonsubscriber at a calling station 40 calls a subscriber at a called station 42, the call is switched normally through the central office 30 whereby a ringing signal is sent to the called station 42 and a ring back tone is returned to the calling station 40. After a predetermined number of rings (for example 5) or immediately if the line is busy, the call is forwarded to the multi-line hunt group 32 by the central office 30. When the central office 30 determines that a line is available, the central office 30 causes the group 32 to ring one of the ports on the DSS 14. If a line is available to the DSS 14, normally a message packet, preferably in SMDI format, is sent from the message desk of the central office 30 to MCU 10 optionally through modems 36 and 38. The packet contains the message desk identification number, the trunk ID indicating which port of the DSS will receive the call, the called number and the calling number. In the present invention, although other options are possible, the called number acts as the mailbox address and of course, a translation can occur between the telephone number and a mailbox address. The central office 30, after transmitting the SMDI packet, places the call on the designated port of the DSS 14. DSS 14, when it detects a call, informs the MCU 10 of a call arrival indicating on which port the call has arrived. The MCU 10, if a packet arrives prior to a call at the DSS 14, waits for a predetermined time, for example 12 seconds, and if the call does not arrive at the DSS 14, discards the packet. If a call arrives at the DSS 14 without the packet arriving within 6 seconds, a non-typical situation, the call is assigned to the first available VPU and the DSS 14 is switched accordingly. The VPU makes the request for the mailbox number, receives the number from the caller and provides the number to the MCU 10 in a phoney SMDI packet. If a matching SMDI packet and call port on the DSS 14 arrive, or after a telephone number has been entered, then the MCU 10 accesses the mailbox database and determines which VPU 16–24 is the home VPU 16 and, if the home VPU 16 is available. The MCU 10 instructs the DSS 14 over a link 44 to route the call to the home VPU 16. A conventional T1 channel (time slot) to channel (time slot) connection command is provided to the DSS 14 from the MCU 10 to effect the routing desired.

In a situation where, for example, a cellular telephone switch is being serviced and inband signalling (DTMF, MF or others) is required, the central office 30 and DSS 14 have a dedicated connection through to a VPU awaiting the in-band signals. When the in-band signals have been received designating the called number, switching of the call to the home VPU, as described above when an SMDI packet is not received and must be entered manually by the caller, is performed.

After the call is switched, the home VPU 16 obtains the relevant subscriber information (including a greeting storage location) from the MCU 10 and then can play a system greeting or a personal greeting recorded by the mailbox owner back through the DSS 14, channel bank 30 and central office 30 to the calling station 40. The home voice processing unit 16 then plays a beep signal to the caller indicating that the caller can begin recording a message. Recording stops when the caller hangs up, presses a touch tone key or is silent for a message time out period. The caller can then review, record or send a message or select send options such as marking the message urgent or confidential. After the caller sends the message the VPU 16 stores the message as a file in the VPU 16 and communicates the location of the message back to the MCU 10 which stores the location of the message in the subscriber's message list mailbox file located in the MCU 10. The MCU 10 then disconnects the routing in DSS 14 and sends any necessary message waiting information to the central office 30.

The above discussion assumed that the home VPU was available, had adequate storage for storing the message and had available call processing ports. When these conditions are satisfied, there is a strong preference, no matter the type of routing algorithm used, for selecting the "home" VPU. If one of the above factors is not correct the call can be routed to a remote VPU 24. This routing to the remote VPU 24, called call switching, also depends on the current switching load on the DSS 14. If the switching load on the DSS 14 is high, for example 99% of capacity, call switching could be prevented. It is possible to route or switch the call to the least busy VPU or the first VPU available on a list with a predetermined order of VPU selections.

As another alternative a more complicated routing determination can be dynamically made using an algorithm which compares all VPUs. Prior to selecting the VPU to handle the call, the MCU 10 can execute a call routing algorithm which determines whether the home VPU 16 or a remote VPU 24 should be selected. First the MCU 10 executes a call placement equation, as set forth below, for each VPU 16–24 that has available ports and available storage to determine which VPU should receive the call:

$$P(I) = W1*H(I) + W2*RS(I) + W3*PA(I)$$

where I is the index specifying the VPU, W1–W3 are weighting factors, H is a binary indicator taking the values of 1 or 0 indicating whether the VPU having the index is the home VPU, RS is a variable that indicates the remaining voice storage capability of the VPU and PA is the number of ports available on the VPU. RS and PA are normalized variables having values between 0.0 and 1.0 while the weights are selected to produce a placement value P between 0.0 and 1.0. The placement values P for the VPUs 16–24 are ranked with the highest ranked VPU being the VPU selected to handle the call. The weighting factors are also selected to treat the home VPU preferentially, if it is available, has sufficient storage for the message and has an available port. For example, if the weighting factor W1 is set so that the first term, W1*H(I), in the equation is only slightly less than the sum of the remaining terms in the equation, whenever the home VPU has available storage and has an available port, the home VPU will receive the highest call placement value.

If the selection algorithm determines that a call should be routed to the remote VPU 24, at the beginning of the call, because the subscriber information structure indicates the greeting is stored on VPU 16, the remote VPU 24 obtains the personal greeting of the subscriber from the home VPU 16 over the internal bus 28 and then plays that personal greeting to the calling station 40 through the DSS 14. The remote VPU 24 would then record the caller's message locally in the remote VPU 24 providing the same review and re-record features previously mentioned. When the call is finished the remote VPU 24 would inform the MCU 10 that the subscriber has a message stored on a remote VPU 24. The MCU 10 would place the location of the message in the subscriber's message list file.

The system has the capability of informing a subscriber that he has new messages by communicating to the central office 30 using a standard Message Waiting Indication (MWI) packet over SMDI. The central office should produce a stutter dial tone the next time the subscriber picks up the phone at the called station 42 or light a light on the called station 42. The subscriber desiring to obtain his messages would then call their own telephone number (which would result in forwarding to the voice mail system) or dial a local access number in the central office 30 for the voice mail system 6. If the caller dials their own number, the MCU 10 could perform the routing algorithm previously mentioned to determine which VPU should handle the call. If a system access number is used the subscriber is routed directly to an appropriate VPU which requests the user enter the mailbox number (their own telephone number) and the MCU 10 once again can perform the call routing algorithm.

If the VPU selected is the home VPU 16, it will play the locally stored personal greeting of the subscriber to the subscriber. If the VPU selected is a remote VPU 24, the remote obtains the greeting from the home VPU 16 as previously described and plays it to the subscriber. If the home VPU 16 does not respond to the request for the greeting message, the system greeting is played to the subscriber. This generally indicates to the subscriber that all messages are not available because the home VPU is down. However, because the greeting and log-in procedures take time during which the home VPU could become available and if the system has the alternate call switching capability, the subscriber should continue until the system indicates all messages are not available.

When the subscriber presses the appropriate log-in digit at the calling station, whether the subscriber is at the previously called station 42 or at another location, the subscriber is prompted to enter an appropriate passcode. The subscriber is then led through a series of typical prompts to listen to messages, send messages, etc. If the subscriber wishes to receive his messages, the system will play the messages to the subscriber no matter where the messages are stored.

If the home VPU 16 is selected by the MCU 10 and messages are to be played to the subscriber, the home VPU 16 obtains and examines the list of messages from the MCU 10. If all the messages are on the home VPU 16, the home VPU 16 plays the messages to the subscriber through the DSS 14 and the central office 30. If upon examining the list, as the messages are sent to the subscriber, if at least one message is indicated as being stored on the remote VPU 24, the remote VPU 24 obtains the message over the bus 28.

As an alternative the remote VPU 24 can send a message to the MCU 10 indicating that a remote message needs to be processed. The MCU 10, based on the availability of the remote VPU 24 and the load on the home VPU 16 can indicate to the home VPU 16 that the home VPU 16 or the remote VPU 24 should process the message. In this alternative the MCU 10 can also communicate back to the home VPU indicating whether the home VPU should obtain the message over bus 28 or whether the processing for this message should be switched to the remote VPU 24. The first option, in which the home VPU 16 continues processing, operates in a manner similar to the way that the home personal greeting was played to a non-subscriber by a remote VPU 24. In this situation the home VPU requests over the internal bus 28 that the remote VPU 24 send the remote message to the home VPU 16. The home VPU 16 stores the message locally and then plays that message to the subscriber. This first option would normally be chosen when the remote VPU has all 24 ports busy or is ranked very low in the selection list computed, using the call placement algorithm at the time the remote message is encountered. If the second option in the alternate system is selected by the MCU 10 and processing is to be switched, the state of the home VPU 16 during the subscriber's call is transferred over the bus 28 to the remote VPU 24. At the same time the MCU instructs the DSS to route the call to the remote VPU 24. The remote VPU 24 then continues call processing by providing the message to the subscriber through the reconfigured DSS 14 and the central office 30.

When the remote message processing is completed, if the subscriber wishes to continue call processing and if it is available, control can be transferred back to the home VPU 16 by sending the state of the remote VPU 16, as to the subscriber's call progress, back to the home VPU 16 over the bus 28 and the MCU 10 switches the DSS 14 back to the original connection arrangement. If the home VPU 16 is not available, the messages are obtained over the bus 28 and provided to the subscriber by the remote VPU 24 until the home VPU 16 becomes available.

In a situation where a remote VPU 24 is selected for the subscriber call processing, the selection could have been made because the home VPU 16 was unavailable. When all of the messages for the subscriber are stored on the home VPU, the remote VPU 24 and MCU 10, in call switching, will attempt to transfer control to the home VPU 16 for each message. During this operation the remote VPU 24, after receiving the message list from the MCU 10, upon examining the first message will indicate to the MCU 10 that a transfer is requested. If the MCU 10 responds with a transfer command, a transfer as previously discussed will occur. If the MCU 10 responds indicating that the remote VPU 24 should process the message, the message is obtained from the home VPU 16 over the bus 28. By having the remote VPU attempt a transfer for each message if the home VPU 16 becomes available, in accordance with the call routing calculations previously discussed, the remote VPU 24 will transfer call processing to the home VPU 16.

If the remote VPU 24 is examining the list of messages and encounters a message stored in its own storage the remote VPU 24 will play the message to the subscriber as previously discussed. If the remote VPU 24 encounters a message storage record indicating that a message is stored on another remote VPU 20, the remote VPU 24 will attempt to transfer to the other remote VPU 20 on which the message is stored.

The present invention has the capability of immediately sending the message to the subscriber if this feature is selected by the subscriber. This can apply to all messages or to some subset such as urgent ones. In this situation, the voice processing unit whether it is the remote processing unit 24 or the home processing unit 16 sends a message to the MCU 10 indicating that outdialing must be effected. The MCU 10 examines the state of the DSS 14 to determine which lines to the central office 30 are available, examines the status of the VPU storing the message to determine whether a port is available on the VPU storing the message to be sent and examines the status of the other VPUs. The MCU selects an available line (channel) through the DSS 14 and sends that selection to the VPU, either remote 24 or home 16 depending on where the message is stored. The VPU examines the selected line to determine whether a call has arrived from the central office 30 using conventional "glare" detection techniques in which the VPU listens for a dial tone on the line to determine if a dial tone is available. If "glare" is detected (for example, no dial tone) the VPU indicates such to the MCU 10 and the MCU 10 selects another line in the DSS 14 and passes the selection information to the VPU. When an available outgoing line is detected by the VPU, the VPU proceeds to dial the number indicated in the subscriber's database for the urgent message. When an off-hook condition is detected at the number dialed, the VPU, as in the previous process, requests that the subscriber enter an appropriate passcode before the message is played. If the correct passcode is entered, the VPU allows the subscriber to log-in and then the VPU plays the out-dial message through the DSS 14 and the central office 30 if requested.

During this process, the MCU 10 selects the VPU which will place the out-dialed call taking into consideration where the out-dialed message is stored. If the VPU storing the message is available and has sufficient ports, it is selected, otherwise a remote VPU is selected. A remote VPU either obtains the message from the storing VPU over the bus 28 or switches the VPU to the storing VPU once the connection is established using the same procedures discussed previously. This out-dial process will also access devices other than telephones, such as pagers, for message delivery. The processes that are executed by the MCU and VPUs during the above discussed operations will be discussed in more detail with respect to FIGS. 6–9.

Figure 2:
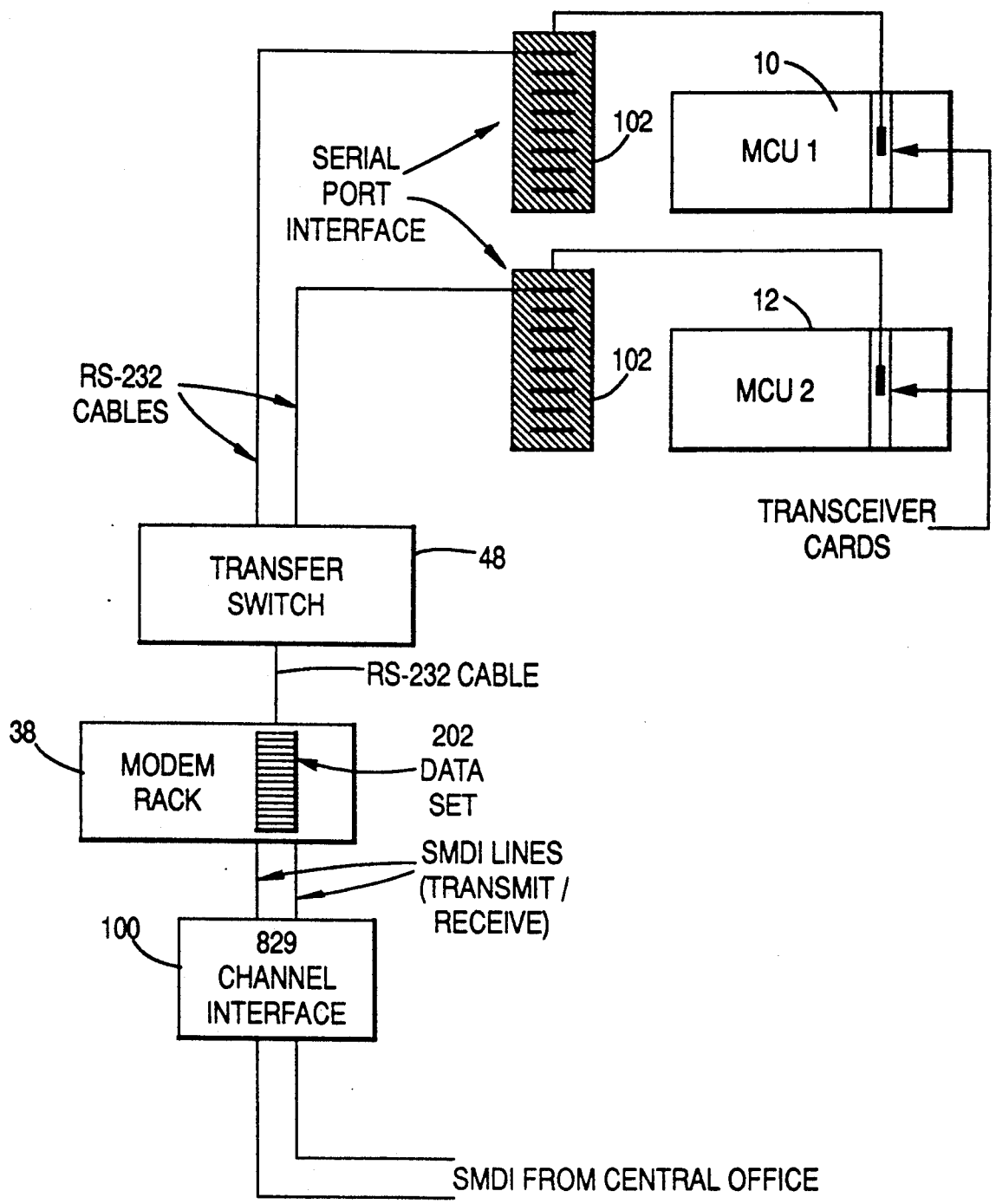
FIG. 2 illustrates in more detail the connection between the central office and the master control units.

FIG. 2 illustrates in more detail the components that allow communication between the MCU 10 and a central office 30. Messages from the central office 30 are received by a conventional 829 channel interface available from Comfab of Addison, Ill. as Model DST4829BJ. This channel interface 100 is connected to a conventional 202 data set modem available from Halmark of Billerica, Mass as model RM16M20255. The modem 38 is connected to a transfer switch 48 available from Data Probe of Englewood, N.J. as Model KAB232R. The transfer switch 48 will be activated by the backup MCU 12 to transfer message traffic to the backup MCU 12 whenever the backup MCU 12 detects that the primary MCU 10 is malfunctioning. The method of determining whether a transfer should occur will be discussed in more detail hereinafter. The transfer switch 48 is connected to the primary 10 and backup 12 MCUs by conventional serial port interfaces 102.

Figure 3:
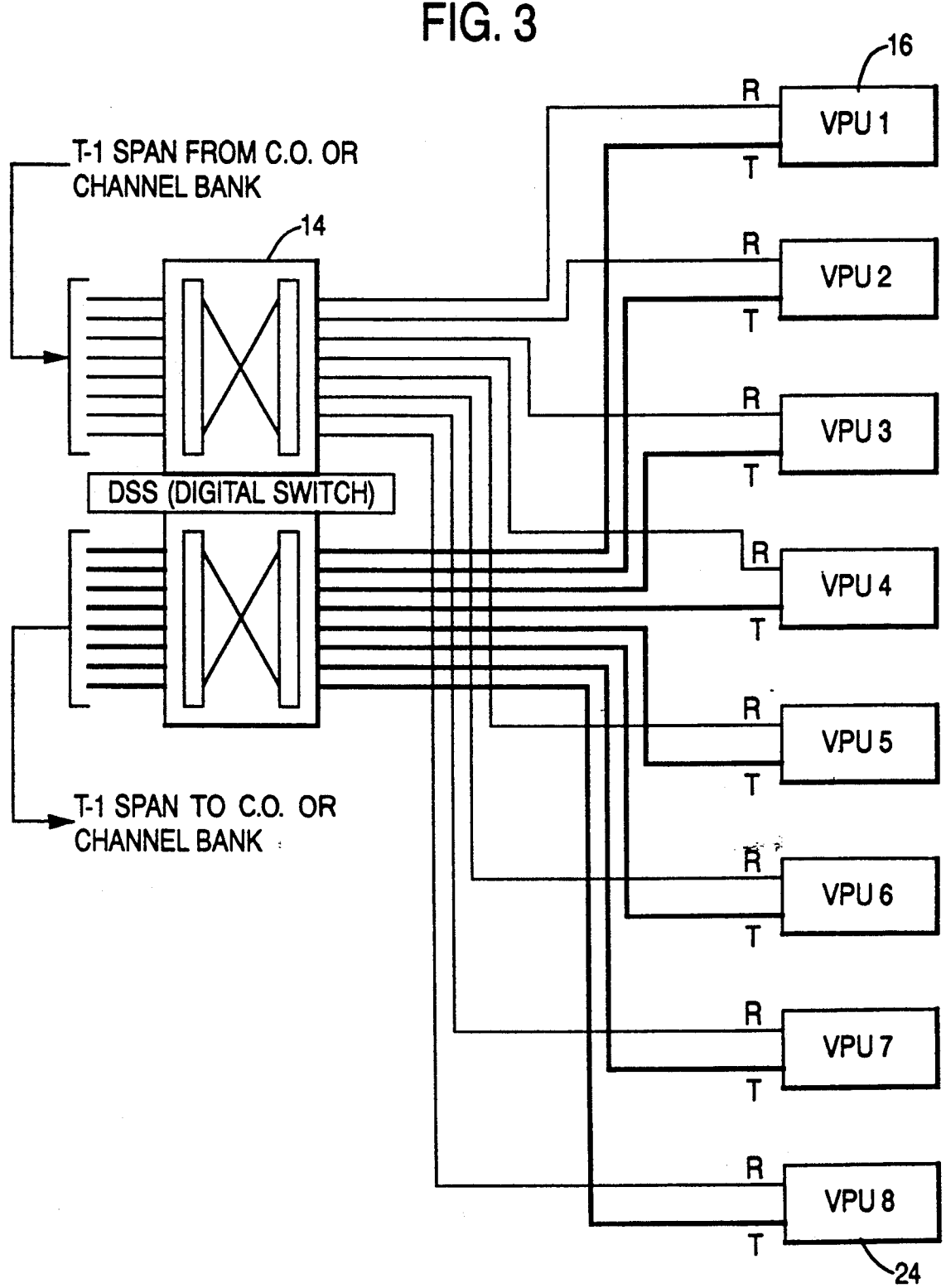
FIG. 3 depicts the connection of the voice processing units to the digital switching system.

FIG. 3 illustrates in more detail the connection arrangement between the VPUs and the digital switch 14. A suitable digital switching system with a 1536 by 1536 channel capacity is available from Excel, Inc. of Sagamore Beach, Mass.

Figure 4:
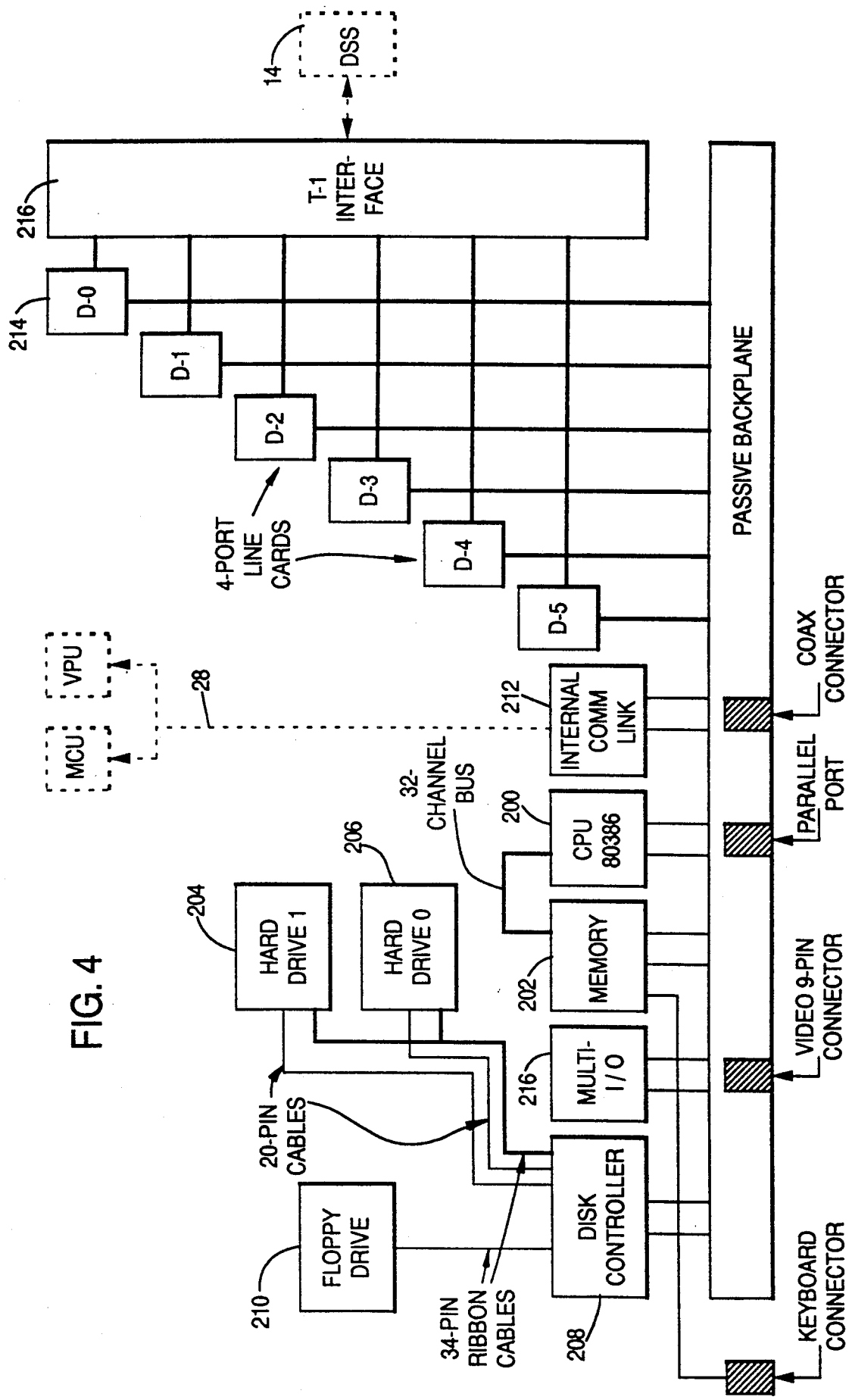
FIG. 4 shows the components of each voice processing unit.
Figure 5:
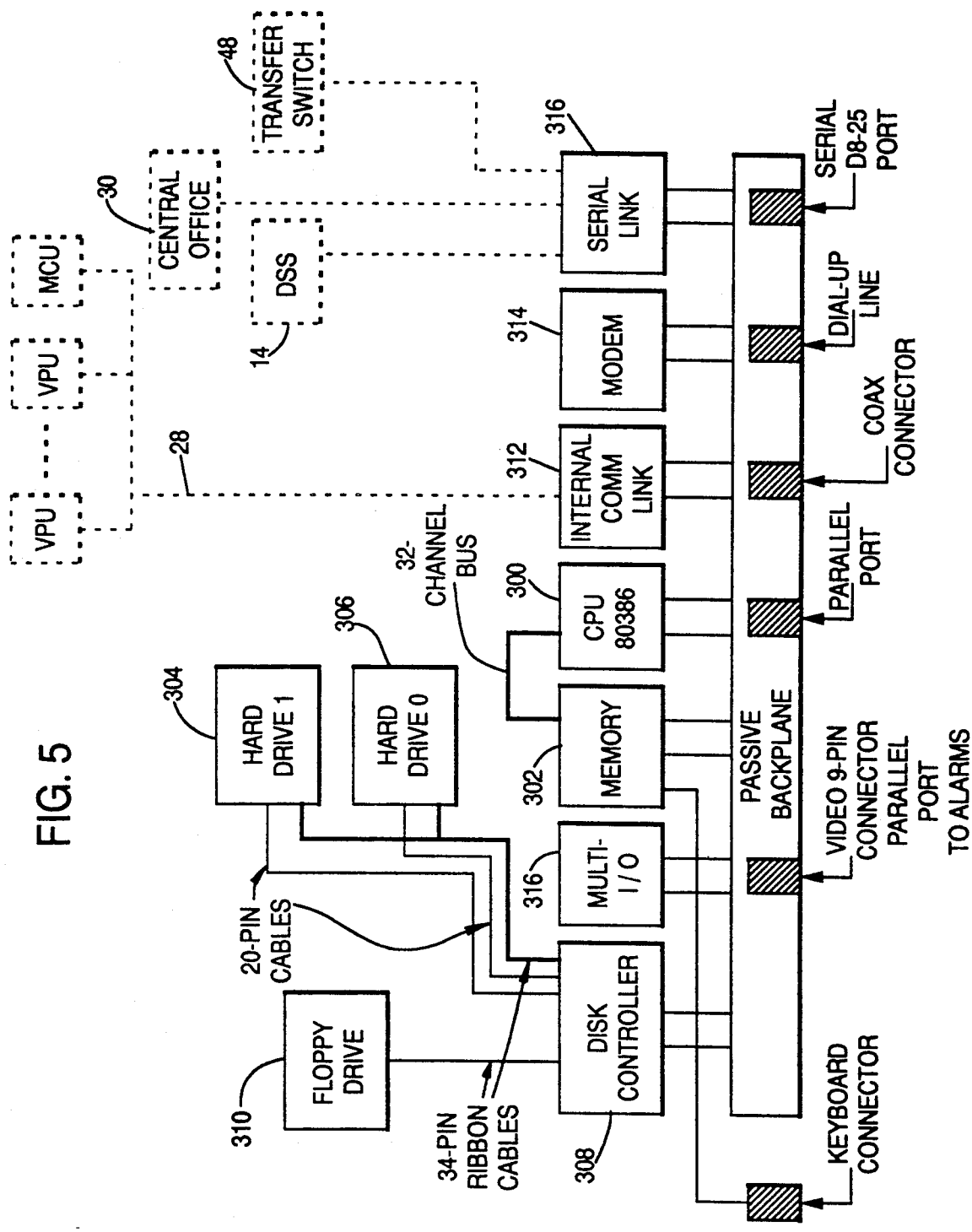
FIG. 5 shows the components of each master control unit.

Each VPU includes the components as illustrated in FIG. 4. Each VPU is essentially an IBM AT type computer with special communications cards mounted on the backplane. The CPU 200 is based on the Intel 80386 processor and an appropriate unit is available from Sigma Design of Fremont, Calif. as Model No. CPA3820BACX. The CPU 200 stores temporary data structures and messages, as well as the VPU control programs that are executing, in a memory unit 202 configured for 8 megabytes of random access memory. A suitable memory unit 202 is available from Sigma Design of Fremont, Calif. as Model CMA380K00N while the memory chips for the unit can be obtained from Centon of Wilmington, Mass. The CPU 200 has direct access to the memory 202 via a conventional 32 channel bus. Messages are stored on two hard disk drives 204 and 206. The hard disk drives, each having a 760 megabyte storage capability, can store the same messages and other information using a technique conventionally called mirror image storage. This operation is controlled by the disk controller 208. The hard drives 204 and 206 are available from Anthem of Wilmington, Mass. as Maxtor Model No. XT8760E while the disk controller is available from DPT of Maitland, Fla. as Model PM301/75. A floppy disk drive 210, which is preferably a Fujitsu Model M2553K03A is used for loading the system initially and for any maintenance modifications that need to be performed. The MCU 10 and other VPUs are connected to the VPU of FIG. 4 through a conventional Ethernet internal communications link 212 which is available from Excelan of Nashaua, New Hampshire as Model No. 9900615-01. This internal communication link 212 can be either two physical Ethernets or a single Ethernet with two logical buses thereon. If two physical Ethernets are used, two internal communication link units 212 must be provided. The communication between the CPU of the VPU and the DSS 14 is through digital ports 214 to a conventional T1 interface 216 and thereafter to the DSS 14, and this interface 216 is available from Dialogic of Parsippany, N.J. as Model No. T1DT1124. The port line cards 214 are also available from Dialogic as Model No. D41B. The port line cards perform a conventional digitizing technique known as ADPCM (Adaptive Delta Pulse Code Modulation) sampling at a rate of approximately 6,000 8-bit samples per second. The digital compression performed using this method allows the CPU 200 to store only four bits of every 8 bit sample. This results in a storage requirement of only 3K bytes per second thereby increasing the capacity of the system. The line cards also have the internal capability of producing a beep, detecting a call and monitoring call progress, generating DTMF, detecting DTMF, generating MF, detecting MF, monitoring on and off hook conditions and going on-hook and off-hook. However, the application process interfaces to the line cards using linked library routines that make system calls to voice line card driver routines. Each line card has two 512 byte buffers that ar alternately loaded and retrieved in ping pong fashion during call processing. The line card automatically takes care of filling and unloading the buffers over the line. The multi-IO unit 216 provides an interface for a video display whenever maintenance of the VPU is necessary.

Each of the master control units 10 and 12 are essentially IBM AT based machines as previously discussed with respect to the VPUs of FIG. 4. This system includes a computer 300, memory 302 with at least 4 megabytes of random access memory, hard drives 304 and 306, floppy drive 310 controlled by disk controller 308 and an internal communication link 312 for the internal bus 28. The same component manufacturers and model numbers of the VPU are applicable to the corresponding components of the MCU. Each MCU additionally contains a conventional modem 314 which allows the system to be accessed by a dial-up access method for maintenance purposes. An appropriate modem is available from Western Microtechnology of Burlington, Mass. as U.S. Robotics Model No. 1-0021-00. The serial link provides serial connection to the digital switch 14, central office 30 and transfer switch 48. The serial link unit 316 is available from Arnet of Nashville, Tenn. as Model No. SP84BKUNITSW.

Figure 6:
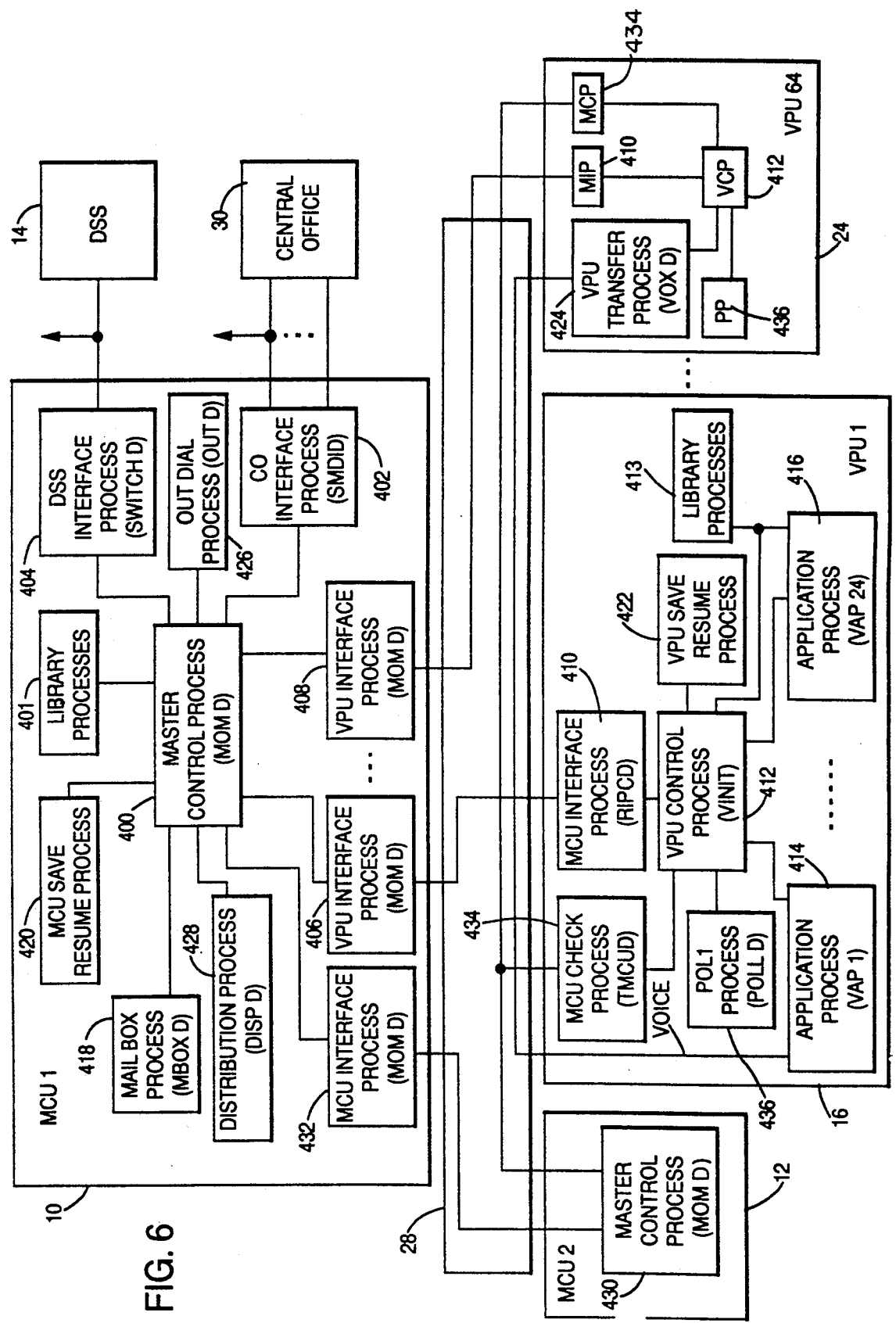
FIG. 6 illustrates the processes executed and the flow of voice messages and data.

During call processing the processes illustrated in FIG. 6 are executed by the various processing units previously discussed. The processes illustrated in FIG. 6 are represented using descriptive names and program acronyms. For example the master control process 400 has the acronym MOMD. The acronyms refer to the corresponding "C" programming language processes or assembler processes in the attached appendix.

When SMDI information from the central office arrives over one of the eight RS232-1200 baud central office lines, the central office interface process 402 examines the message and places an appropriate message in the message buffer for the master control process 400. At the same time, a call arrival (service request) packet arrives from the DSS 14 through DIP 404 to MCP 400. The MCP 400 coordinates the two packets (call arrival and SMDI) through the referenced channel in each packet. If MCP 400 receives an SMDI packet without receiving a call arrival packet within 12 seconds, it discards the SMDI packet. If MCP 400 gets a call arrival packet without an SMDI packet within 6 seconds, MCP 400 places the call on the least busy VPU without SMDI information.

The master control process 400, as previously discussed, determines how to route the call through the switch 14 and transmits that information to the DSS interface process 402 which provides an appropriate channel assignment to the DSS 14. This channel assignment is entered on a list in the MCU and includes port assignments for the VPUs. Based on the selection of the voice processing unit the master control process 400 provides a copy of the SMDI packet and the call routing information to a corresponding VPU interface process 406.

Each interface process described herein essentially translates an information packet from one protocol to another protocol allowing processes with different message formats to interact. Each interface process also calls appropriate driver processes through library processes 401. The driver routines are conventional routines that can be obtained from the equipment manufacturer or produced by one of ordinary skill in the art. The VPU interface process 406 for each one of the VPUs is an individually spawned process of the master control process. This process is a connection oriented process or virtual link process rather than a packet oriented process. In a virtual link process, the process will terminate if the connection to the designated VPU fails. This process is automatically supported by the TCP/IP protocol executed by the processes provided by the net card manufacturers. If an interface process terminates, MCP 400 is informed by the operating system and changes the status of the corresponding VPU from available to unavailable. The MCP 400 then periodically tries to restart the interface process as long as the system configuration information indicates the VPU should be online and active. When the interface process successfully executes, the VPU is back on line and the status is changed to available. An appropriate connection protocol and process is available from Excelan.

Figure 7:
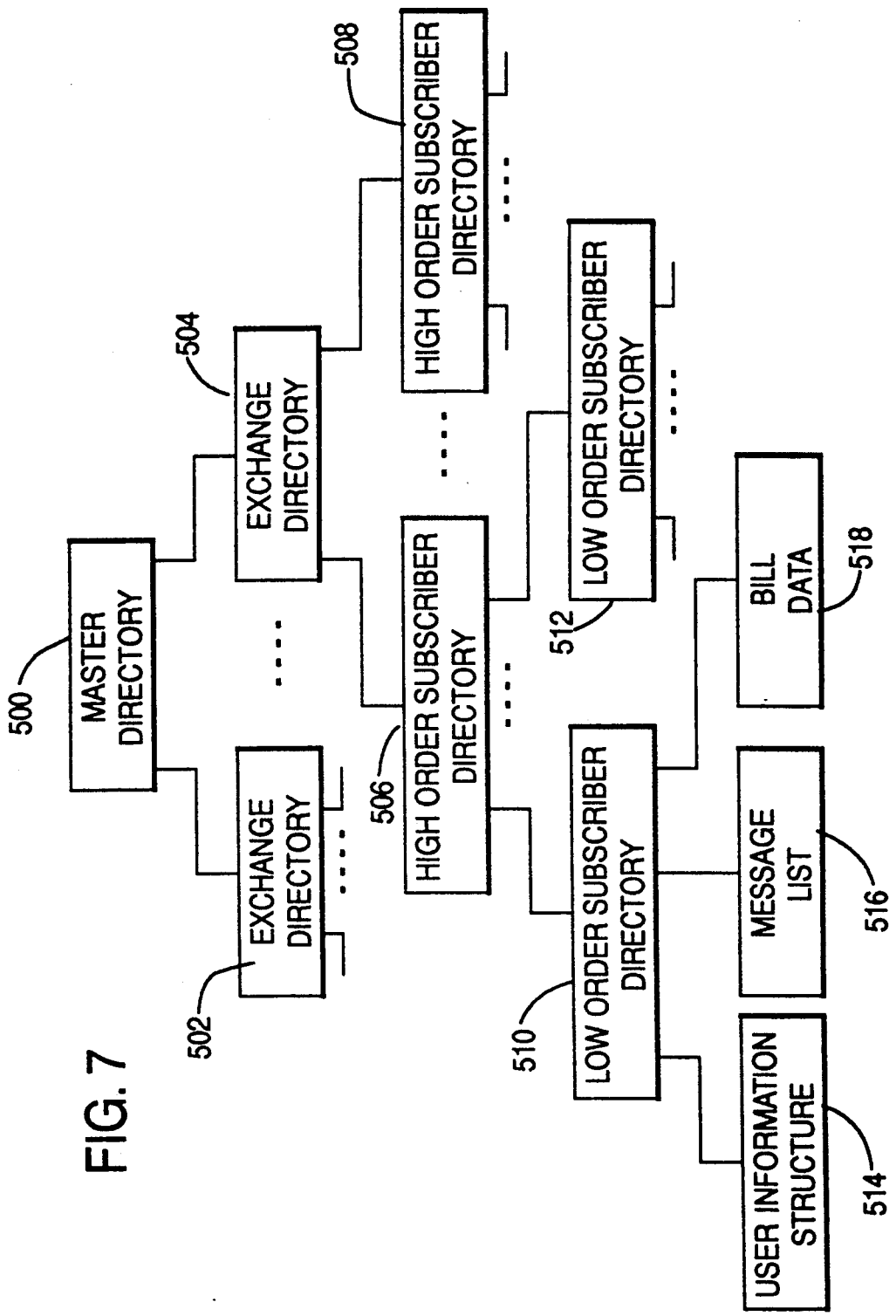
FIG. 7 illustrates the directory structure of files associated with a subscriber.

The VPU interface process 406 translates buffer messages from the operating system format (Xenix) to the format of the Ethernet internal bus 28. The information is transmitted to the appropriate VPU 16 over the bus 28 to an MCU interface process 410 in the appropriate VPU. The routing of the messages to the appropriate VPU or MCU process is automatically handled by the TCP/IP protocol using, for example device or process addresses. The MCU interface process 410 translates the message into the operating system message format of the VPU and provides it to the VPU control process 412. An application process 414, when it detects an incoming call (a ring), requests that the VCP 412 provide a call information packet including the incoming port and the SMDI packet. When the AP detects a ringing call, it asks VCP 412 if there is any SMDI packet waiting for a VPU port. If there is, VCP 412 forwards the packet. If not, AP 414 will wait for up to 5 seconds for a packet to arrive. If none arrives, it is handled the same as if no SMDI packet arrived from the central office 30. The VPU control process 412 then provides the message to the application process 414. The application process 414 can be a voice mail process or some other process used for message processing. The application process 414 then controls the communication process with the subscriber or caller over the communication ports 214 through the DSS 14 and central office 30 using card driver and other library processes 413. In a situation where the application process 414 is to store a message the application process through VPC 412, MIP 410 and VIP 406 requests from the MCP 400 the subscriber information (a user information structure) which defines the characteristics of the subscribers mail box (greeting length, message length, options etc). The master control process 400 maintains a directory structure of such files as illustrated in FIG. 7 and which will be discussed in more detail later.

Once the user information structure is obtained by MCP 400, it is transferred through the VIP 406, the MIP 410, the VCP 412 to the appropriate application process 414 and stored in a local cache. Several information structures can be stored in the cache at the same time. By storing the user information structure in the local VPU cache, requests for information from the user information structure can be processed locally without accessing the internal bus. The cache for user information is a read only cache. Any requests for update are immediately written back. However, the updated information is kept in the cache. Up to five user information structure entries are cached and additional entries needed are not permitted. The cache is emptied at the end of the call. Any request that cannot be serviced by the cache is sent to the MCU.

The application process 414, once the user information structure arrives, plays the appropriate greeting stored on the hard disk for the subscriber as a greeting file identified by the telephone number. The application process 414 then records and stores any message, as a message file on the hard disk. The application 414 asks VCP 412 for a post office entry in which to store voice data. AP 414 uses this file for message storage and later adds it to the message list for the subscriber.

Figure 8:
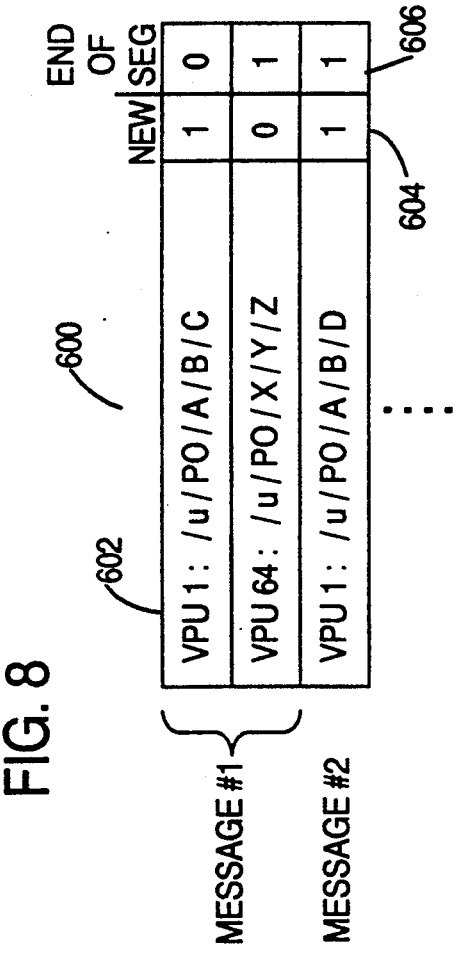
FIG. 8 depicts how messages are stored.

A message may be terminated due to several conditions: the caller hangs up, the caller pauses for a predetermined length of time, for example 8 seconds, the message has exceeded the message limit, or a DTMF is detected. If a DTMF signal has been received at the end of a message, call processing then continues allowing the caller to review the message mark it as urgent, etc. Once the message is complete and marked, if necessary, the application process 414 sends a location storage message to the MCP 400 which creates a message list in a format as illustrated in FIG. 8. When the line finally goes on hook, the application process 414 notifies MCP 400 that the call is finished. MCP 400 accesses the channel assignment list and issues a disconnect command to the DSS 14 for that assignment. The application process 414 also indicates whether the message waiting indicator should be turned on or if outdialing is necessary. If the indicator should be turned on, the MCP 404 prepares an appropriate MWI packet and provides it to the CIP 402 which provides the packet to the central office 30.

Figure 9:
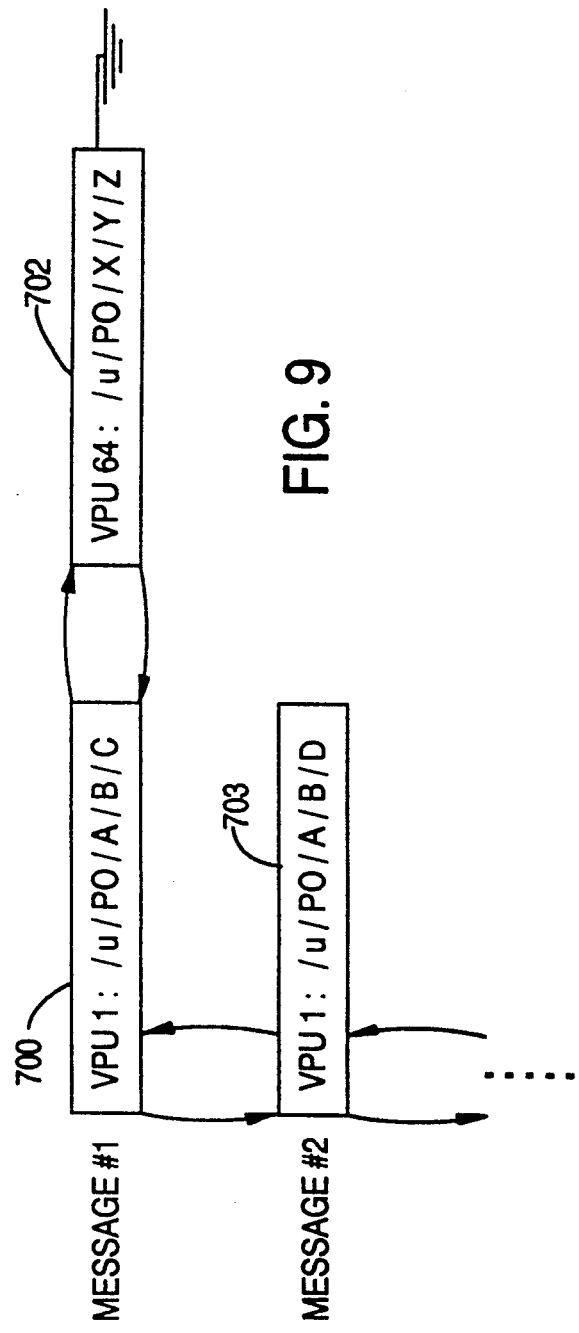
FIG. 9 shows a doubly linked list used to output messages to the subscriber.

The message file for the user, as illustrated in FIG. 8, includes message records which identify which VPU the message is located on, the file name for the message and whether the message is a new message and whether this is the end of a segmented message. When a subscriber accesses the system, the application process 414 obtains the subscriber information from the master control process 400, verifies the passcode and presents the options for message retrieval. Whenever the subscriber logs into the system, the message waiting indication is turned off. Also, any pending outdial requests to the subscriber are detected. The application 414 then requests from MCP 400 the list of messages as illustrated in FIG. 8. The application process 414 will then create a doubly linked list as illustrated in FIG. 9. The doubly linked list is used by the application process to index through the messages as the user desires.

In the example illustrated in FIGS. 8 and 9 two messages have been linked together by a previous subscriber and used to create a single message #1. Such a situation occurs when a first subscriber leaves a message for the current subscriber and appends a message from a third subscriber thereto. The subscriber, when playing messages, can select the messages by message number, by urgency etc. Assuming that the subscriber wants to sequentially pass through the messages illustrated in FIGS. 8 and 9, the application process 414 would first obtain the message indicated by the first message record 700 from the local hard disk and play the message to the subscriber. When the end of the locally stored message 700 is encountered VAP 414 would first check to determine if the remote voice data is stored in its local cache. If it is, the message is played. If it is not available locally, AP 414 would connect to VIP 424 over the internal bus 28. This connection is a request for remote voice data and part of the request is which voice data file is needed. Voice data is sent over the connection in 8k byte segments. At the same time, if there is room in the local cache, the remote voice data is cached on the local drive. As the AP 414 is receiving the data, it is played to the caller. The transfer of data is continued until either the message is played to completion or the message is terminated due to DTMF being received. If the message is terminated before it is complete, the message is removed from the local cache. Entries remain in the local cache as long as they are accessed within a predetermined amount of time, for example 24 hours. If the MPU 64 is not available, VTP 424 will not respond to the message transfer request and the application process plays a message to the subscriber that the message is not currently available. When message 703 is encountered application process 414 provides the third message 703 to the subscriber off the local hard drive.

At the end of each message the user is given the option of deleting the message. If the subscriber wants the message deleted, the application process 414, after call disconnection, frees up local storage by deleting any message files to be deleted from the local directory, sends a delete message through MCP 400 to the VCP 412 storing any remote messages to be deleted and sends a message to MCP 400 specifying the remaining messages that need to be removed from the message list. MCP 400 proceeds to remove the messages from the list. When the subscriber finally goes on hook, the application communicates this to the master control process 400. The MCP 400 through DIP 400 instructs the DSS 14 to disconnect the call routing.

Any message stored in the system can cause outdial notification to be performed and depends on the configuration parameters for the subscriber. If outdial notification needs to be performed, the application 414 issues an outdial request through the appropriate processes to the outdial process 426. ODP 426 maintains a list of pending outdial requests and when they need to be performed. When the time arrives for making an outdial, the MCP can schedule the request to be performed by the VPU which contains the original message. MCP 400 could issue a request of DSS 14 to connect an outgoing line to the appropriate VPU port. MCP 400 would forward the outdial request through VCP 412 to AP 414 to service the request. The MCP 400 also requests that the VPU storing the message start the application process 414 corresponding to the VPU port designated. This process will perform the outdialing. The application process 414 will examine the port for a dial tone, if a dial tone does not exist the application process will go on hook, the outdial will be aborted and ODP 426 will be informed and the application process 414 will handle the incoming call. The ODP 426 will then reissue the request. When a dial tone is detected, the application will dial the number specified in the outdial file. If the dialed station does not reply within a certain length of time, for example four rings it reaches a busy line, the attempt is terminated and rescheduled. If the dialed station answers and if the outdial message is to a pager system, the appropriate pager tones are played. If a human answers, a greeting message is played indicating a message is awaiting delivery and asking for the passcode. If the correct passcode is given the message is played as previously described. The pending requests are deleted as soon as the subscriber enters the passcode as previously discussed.

If the application 414 performed a pager type message sending operation, the message is maintained on the outdial process message list until the subscriber calls in and gets the message. If the message remains on the list longer than a certain length of time, for example fifteen minutes, the pager will be beeped again. This will continue until the pager has been beeped a predetermined number of times.

Whenever a caller inputs a message into the system that should be distributed to a limited set of the subscribers (a group message), application process 414, in addition to sending the location of the message to the master control process 400 to create an appropriate mailbox message list entry, causes the master control process 400 to activate the distribution process 428. The distribution process 428, proceeds to access the group of designated mailboxes in the system and create a message entry for each subscriber referencing the location of the group message. Appropriate message waiting indicator messages are also sent to the central office 30. When a subscriber which should receive the distribution message accesses the system, the MCP 400 provides the appropriate list to the application process 414.

When a message is to be sent to all subscribers, it is called a broadcast message. When a broadcast message is created the message is listed in a single system wide broadcast mailbox based on a menu selection by a subscriber. This type of message does not create a message waiting message indicator for the central office 30. When a subscriber logs into the system, the application process 414 checks the broadcast mailbox. If a broadcast message exists it is added to the subscribers message list during the log-in process by the voice application.

The master control process 430 in the hot standby MCU 12 executes all of the processes that the master control process 400 in the primary MCU 10 executes, so that the master control process 430 is ready to take over processing when the MCU 10 fails. This is accomplished by the master control process 400 sending all requests from processes to the master control process 430 through the master control interface process 432. The process 430 then performs appropriate processing with the corresponding interface processes inactivated. During operation, the poll process 436 periodically sends poll requests over the virtual link to the MCU 10. The MCP 400 determines whether each VPU is operating by determining whether a request from the VPU is received every two minutes. The master control process 430 in the hot standby MCU 12 also periodically checks on the operating state of the primary master control unit 10. This is performed by the master control process 430 requesting that the master control process 400 respond to a poll request every thirty seconds. If the master control process 400 does not respond within a predetermined time period, for example, 30 seconds, the master control process 430 requests that the VPUs 16-24 confirm that the primary MCU 10 is malfunctioning. The master control unit 12 places a broadcast message on the internal bus 28 using a message protocol, such as UDP available from Excelan. The message is processed by the master control unit check process 434 of each VPU. The master control unit check process 434 requests that the VCP 412 poll the MCP and if a reply is not received with 10 seconds the virtual link is considered broken. As previously discussed, the MCU interface process is a connect oriented process rather than a message oriented process and if the connection between the corresponding VPU interface process 406 and the MCU interface process 410 has failed this polling request will recognize this condition. The process 434 responds to the broadcast request of the master control process 430, based on the response to the VCP 412 poll, indicating whether the connection between the VPU and MCU 10 is active. If the master control process 430 receives one indication from any VPU that the primary MCU 10 is functioning properly, the master control process 430 in the hot standby MCU 12 will not take over operation and will try to reestablish a virtual connection to the MCU 10. If the primary MCU 10 has failed each of the MIP processes 410 in the VPUs have also failed. When MCUP 434 asks VCP 412 to test the link, if MIP 410 has terminated because of a failed link, MIP 410 will restart and place a message on the bus 28 every ten seconds requesting that the active MCU respond indicating that it is in control. The other VPUs perform the same operation. The hot standby master control process 430 when taking over the operation of the failed MCU activates its VPU interface processes 406-408 which respond to the requests by the MIPs 410 indicating that the hot standby 12 has taken control. The process 430 also activates the standby CIP 402 process. The activation of this process causes switch 48 to switch to send data to the MCU 12. DIP 404 is also started. The hot standby 12 then becomes the primary. When the MCU 10 comes back on line, it determines that the hot standby unit 12 is active and controlling, and converts itself into a hot standby unit.

During power up initialization, the MCUs each load the system configuration table designating whether each MCU is a primary and also indicating how many VPUs are configured in the system. The primary 10 and standby 12 MCU's immediately begin to try and establish a link virtual between the standby master control process 430 and MIP 432 and MCP 400. The attempt to establish the link will continue for a predetermined time, for example 5 minutes. The VPU's also start up but do not know which MCU is the primary. As a result, VCP 412 and MIP 410 begin broadcasting messages on the bus 28 requesting connection to the primary MCU 10. If the primary MCU 10 does not respond to the standby MCU 12 within the predetermined time period previously mentioned, the MCU 12 will start its interface processes and respond to the broadcast messages of the VPUs, thereby taking over as the primary. If the configured primary MCU 10 later comes on line it queries the other MCU and determines that it is running as primary and then configures itself as the list standby.

As previously discussed the telephone number of the subscriber is used as the mailbox address for that subscriber. Because the Xenix file handling utilities search directory files sequentially, a directory structure, such as illustrated in FIG. 7, is needed to increase the speed of file location. The master directory 500 has listed therein exchange directories 502 and 504 for each exchange authorized in the system. In a telephone number, excluding the area code, the first three digits of the telephone number are the exchange number. Each exchange directory includes plural high order subscriber directories 506 and 508. The next two digits in the telephone number after the exchange are used to select a high order directory within the high order directory list of the exchange directory. The final two digits are used within the high order directory to select among plural low order subscriber directories 510 and 512. The low order subscriber directory lists files for each subscriber in the system corresponding to the low order digits, the last two digits, in the telephone number. For example, the lower order subscriber directory lists a user information structure file 514 which stores the information necessary to process a call for a subscriber, a message file 516 which lists the locations of the messages for the user and a bill data file 518 which lists the name and address of the subscriber. If for example the user's telephone number was 555-1122 the 555 exchange directory would be selected from the list in the master directory, the 11 high order subscriber directory would be selected from the exchange directory list and the 22 low order subscriber directory would be selected within the 11 high order directory list. The user information structure file 514 for the subscriber or the message list file 516 for the subscriber would be selected as appropriate.

The mailbox process 418 services requests for creation, deletion and reinitialization of subscribers. This process creates or removes the subscriber directories and asks for mail box data from MCP 414. Requests for the services provided by this process typically come from an administration program, however, the subscriber, through the application process 414 can request this service.

If the master control process 400 determines, during call processing, that process control should be transferred, call switching can be performed. A way in which call switching can be performed is to have the master control process execute the MCU save-resume process 420 which sends a packet over the data bus 28 which causes the VPU save and resume process 422 to be executed. The VPU save-resume process 402 can save the state of the application process 414 and transfer it to VPU 24. The save-resume process 402 executing on VPU 16 transfers all of the current state to VPU 24. This state includes all pertinent data structures such as the doubly linked list in FIG. 9 and the stack from the application process 414 which contains among other things the thread of execution and values of parameters which are passed between subroutines in the application process 414. The master control process 400 causes the appropriate connections to be made in the digital switch 14. This allows the application process in the VPU 16 to handle another call or application while the other VPU 24 continues call processing where the VPU 16 left off. The caller is completely unaware that the call has been shifted from one call processing unit to another.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A message communication system connected to a telephone switching system, comprising:
    at least first and second message processing means each capable of processing a first message by initiating buffering the first message and storing and/or retrieving and transmitting the first message;
    digital switching means for routing the first message to and/or from a selected one of said first and second message processing means from and/or to the telephone switching system; and
    control means, connected to said digital switching means and said first and second message processing means, for selecting an available one of said first and second message processing means which is available to process the first message and causing said digital switching means to route the first message to and/or from the selected one of said first and second message processing means.

2. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
    (a) selecting, by said control processor, one of said first and second message processing units for processing a first message;
    (b) controlling the digital switching system to route the first message to and/or from the selected one of said first and second message processing units; and
    (c) processing the first message by the selected message processing unit initiating buffering the first message and storing and/or retrieving and transmitting the first message.

3. A message communication system connected to a telephone switching system, comprising:
    at least first and second message processing means each capable of processing a first message by initiating buffering the first message and storing and/or retrieving and transmitting the first message;
    digital switching means for routing the first message to and/or from a selected one of said first and second message processing means from and/or to the telephone switching system; and
    control means, connected to said digital switching means and said first and second message processing means, for selecting an available one of said first and second message processing means which is available to process the first message and causing said switching means to route the first message to and/or from the selected one of said first and second message processing means, said control means including a data structure comprising:
        a linked list of message location records, each record including a storage location indicator indicating which of said first and second message processing means stores the first message and used for controlling switching by the digital switching means and interunit message transfer by the first and second message processing means.

4. A message communication system as recited in claim 1, wherein said control means comprises:
    routing means for controlling the routing by said digital switching means.

5. A message communication system as recited in claim 4, wherein when said first message processing means initiates processing of the first message, said control means causes said second message processing means to process the first message when said first message processing means becomes unavailable after the first message processing is initiated by said first message processing means, by obtaining the first message from said first message processing means.

6. A message communication system as recited in claim 4, wherein when said first message processing means initiates message processing and said second message processing means is designated to continue processing the first message, said control means causes said digital switching means to change the routing from said first message processing means to said second message processing means and causes message processing to be transferred from said first to said second message processing means.

7. A message communication system connected to a telephone switching system, comprising:
    at least first and second message processing means each capable of processing a first message by initiating storing and/or retrieving and transmitting the first message;
    digital switching means for routing the first message to and/or from a selected one of said first and second message processing means from and/or to the telephone switching system and said first message processing means being designated a home message processing means for the first message; and
    control means, connected to said digital switching means and said first and second message processing means, for selecting an available one of said first and second message processing means which is available to process the first message and causing said switching means to route the first message to and/or from the selected one of said first and second message processing means and said control means controlling routing responsive to which of said first and second message processing means is said home processing means, availability of said home and second message processing means, available message storage on said home and second message processing means and availability of message ports to said home and second message processing means.

8. A message communication system as recited in claim 7, wherein said control means controls routing in accordance with $$P(I) = W1*H(I) + W2*RS(I) + W3*PA(I)$$

where I is an index specifying one of said first and second message processing means, W1–W3 are weights, H is an indicator indicating whether the one of said first and second message processing means is the home message processing means, RS is available storage on the one of said first and second message processing means, PA is a number of the message ports unoccupied on the one of said first and second message processing means and P is a message placement value, and the one of said first and second message processing means with the highest message placement value processes the first message through said digital switching means.

9. A message communication system as recited in claim 8, wherein the weights W1-W3 are set to select said home message processing means when said home message processing means is available, has at least one unoccupied message port and has sufficient storage for the first message.

10. A message communication system as recited in claim 1, wherein said first and second message processing means are for processing more than said first message simultaneously.

11. A message communication system as recited in claim 1, further comprising a network connected to said first and second message processing means and said control means, said network carrying the first message between said first and second message processing means and carrying data between said first and second message processing means and said control means.

12. A message communication system as recited in claim 1, wherein the first message is stored in the selected one of said first and second message processing means.

13. A message communication system as recited in claim 5, wherein said first message processing means suspends operation after initiating message processing while said second message processing means processes the first message.

14. A message communication system as recited in claim 5, wherein said first message processing means processes a second message while said second message processing means processes the first message.

15. A message communication system as recited in claim 5, wherein a message processing state is transferred from said first message processing means to said second message processing means.

16. A message communication system as recited in claim 1, wherein the first message is a voice message.

17. A message communication system connected to a telephone switching system, comprising:
at least first and second message processing means each capable of processing a first message by initiating storing and/or retrieving and transmitting the first message;
digital switching means for routing the first message to and/or from a selected one of said first and second message processing means from and/or to the telephone switching system; and
control means, connected to said digital switching means and said first and second message processing means, for selecting an available one of said first and second message processing means which is available to process the first message and causing said switching means to route the first message to and/or from the selected one of said first and second message processing means; and
said second message processing means including a message cache for receiving and storing the first message transferred from said first message processing means.

18. A message communication system as recited in claim 1, wherein said message communication system serves at least two users, each user having a message box, said control means storing user message box information and sending the message box information to the one of said first and second message processing means processing the first message.

19. A message communication system connected to a telephone switching system, comprising:
at least first and second message processing means each capable of processing a first message by initiating storing and/or retrieving and transmitting the first message;
digital switching means for routing the first message to and/or from a selected one of said first and second message processing means from and/or to the telephone switching system; and
control means, connected to said digital switching means and said first and second message processing means, for selecting an available one of said first and second message processing means which is available to process the first message and causing said switching means to route the first message to and/or from the selected one of said first and second message processing means; and
said message communication system serving at least two users, each user having a message box, said control means storing user message box information and sending the message box information to the one of said first and second processing means processing the first message and said message communication system processing at least the first message and a second message which are stored in one of said first and second message processing means and said control means including a list of message storage locations for each user indicating which of said first and second message processing means stores said first and second messages.

20. A message communication system as recited in claim 4, further comprising backup routing means for controlling routing when said routing means fails.

21. A message communication system connected to a telephone switching system, comprising:
at least first and second message processing means each capable of processing a first message by initiating storing and/or retrieving and transmitting the first message;
digital switching means for routing the first message to and/or from a selected one of said first and second message processing means from and/or to the telephone switching system; and
control means, connected to said digital switching means and said first and second message processing means, for selecting an available one of said first and second message processing means which is available to process the first message and controlling said switching means to route the first message to and/or from the selected one of said first and second message processing means; and
said first message processing means can send a stored message, said first processing means indicating to said routing means that a stored message needs to be sent, said routing means controlling said switching means to route said stored message and said first processing means sending said stored message through said digital switching means.

22. A message communication system as recited in claim 21, wherein said first message processing means sends a telephone number of a location to which the stored message is to be sent to said telephone switching system and detects an off hook condition at the location.

23. A message communication system as recited in claim 22, wherein when said first message processing means becomes unavailable after the storage of the stored message, said second message processing means obtains the stored message from said first message processing means, said routing means controls said digital switching means to route the stored message from said second message processing means to the location after the off hook condition is detected.

24. A message communication system as recited in claim 19, wherein when the first message is to go to each of two users, said one of said first and second message processing means which receives the first message indicates to said control means an identity of the users, and said control means adds a location of the first message to the message box information for each of the two users.

25. A message communication system as recited in claim 17, wherein when a broadcast message is stored in said first message processing means and a user accesses said second message processing means, said second message processing means obtains the broadcast message from said first message processing means, stores the broadcast message in said cache and provides the broadcast message to the user.

26. A voice message communication system connected to a central office switching system, said communication system comprising:
- a home voice processing computer, having voice ports, a home message cache and local message storage, processing voice messages and sending voice messages to and receiving voice messages from the central office switching system in accordance with message box information, said home processing computer specified the home for a user's message processing, sending and receiving;
- a remote voice processing computer, having voice ports, a remote message cache and local message storage, processing voice messages, sending voice messages to and receiving voice messages from the central office switching system in accordance with the message box information;
- a digital switching system, connected to said home voice processing computer, said remote voice processing computer and the central office switching system, for routing messages between the central office switching system and said processing computers;
- a local area network having a data path and having a message path connecting said home voice processing computer and said remote voice processing computer and;
- a master control computer, connected to said digital switching system and to said home and remote voice processing computers via said data path, storing a message box having the message box information for each user, the message box information listing messages for each user, each list entry indicating which of said processing computers stores each user's messages where either processing computer can store a user's messages, said master control computer controlling processing by and routing of messages to and from said processing computers through said digital switching system in accordance with $P(I) = W1*H(I) + W2*RS(I) + W3*PA(I)$, where I is an index specifying one of said processing computers, W1-W3 are weights, H is an indicator indicating whether the one of said processing computers is the home processing computer, RS is an available amount of the local storage for the one of said processing computers, PA is a number of unoccupied voice ports on the one of said processing computers, and P is a message placement value, the one of said processing computers with the highest placement value being selected from processing, sending and/or receiving the voice messages, the weights being set to route messages from the user to said home processing computer when said home processing computer is available, has at least one unoccupied voice port and has sufficient local storage for the messages, said control computer routing a user's messages to said remote computer when said home computer is not selected, when one of said processing computers stores one of the messages and the other one of said processing computers is selected for processing the one of the messages, the message is transferred over the message path and stored in the respective one of the home and remote message caches for processing by the selected processing computer if the one of said processing computers is unavailable, message processing being transferred to the one of said processing computers from the other one of said processing computers along with changing of the message routing by said digital switching system if the one of the processing computers is available, said master control computer transferring the message box information to the one of the processing computers processing, sending or receiving the messages for the user.

27. A method as recited in claim 2, wherein when the first message processing unit stores the first message and the first message processing unit becomes unavailable after the first message is stored by the first message processing unit, step (c) includes the second message processing unit processing the first message by obtaining the first message from the first message processing unit.

28. A method as recited in claim 2, wherein step (c) includes transferring message processing from the first message processing unit to the second message processing unit when the first message processing unit initiates message processing and the second message processing unit is designated to continue processing the first message.

29. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
(a) selecting, by said control processor, one of said first and second message processing units for processing a first message;
(b) controlling the digital switching system to route the first message to and/or from the selected one of said first and second message processing units; and
(c) processing the first message by the selected message processing unit initiating storing and/or retrieving and transmitting the first message; and
wherein step (b) includes controlling routing responsive to which of said first and second message processing units is a home message processing unit, availability of each of the first and second message processing units, available message storage on the first and second message processing units and availability of message ports to the first and second message processing units.

30. A method as recited in claim 29, wherein routing is controlled in accordance with $$P(I) = W1 \cdot H(I) + W2 \cdot RS(I) + W3 \cdot PA(I)$$

where I is an index specifying one of the first and second message processing units, W1–W3 are weights, H is an indicator indicating whether the one of the first and second message processing units is the home message processing unit, RS is available storage on the one of the processing units, PA is a number of the message ports unoccupied on the one of the first and second message processing units and P is a message placement value, and the one of the first and second processing units with the highest message placement value processes the message through the digital switching system.

31. A method as recited in claim 30, wherein the weights W1–W3 are set to select the home message processing unit when the home message processing unit is available, has at least one unoccupied message port and has sufficient storage for the message.

32. A message processing method for a message communication system connected to a telephone switching system, the message communication system including a digital switching system connected to the telephone switching system, at least first and second message processing units connected to the digital switching system, a control processor connected to the digital switching system and a network connected to said control processor and said first and second message processing units, said method comprising the steps of:
  (a) selecting, by said control processor, one of said first and second message processing units for processing a first message;
  (b) controlling the digital switching system to route the first message to and/or from the selected one of said first and second message processing units; and
  (c) processing the first message by the selected message processing unit initiating storing and/or retrieving and transmitting the first message; and
  wherein when the first message processing unit stores the first message and the first message processing unit becomes unavailable after the first message is stored by the first message processing unit, step (c) includes the second message processing unit processing the first message by obtaining the first message from the first message processing unit and the network connecting the first and second message processing units carrying the first message between the first and second message processing units.

33. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
  (a) selecting, by said control processor, one of said first and second message processing units for processing a first message;
  (b) controlling the digital switching system to route the first message to and/or from the selected one of said first and second message processing units; and
  (c) processing the first message by the selected message processing unit initiating storing and/or retrieving and transmitting the first message; and
  wherein when the first message processing unit stores the first message and the first message processing unit becomes unavailable after the first message is stored by the first message processing unit, step (c) includes the second message processing unit processing the first message by obtaining the first message from the first message processing unit, and during step (c) the first message processing unit suspending operation while the second message processing unit processes the first message.

34. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
  (a) selecting, by said control processor, one of said first and second message processing units for processing a first message;
  (b) controlling the digital switching system to route the first message to and/or from the selected one of said first and second message processing units; and
  (c) processing the first message by the selected message processing unit initiating storing and/or retrieving and transmitting the first message; and
  the first message processing unit processing a second message while the second message processing unit processes the first message.

35. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
  (a) selecting, by said control processor, one of said first and second message processing units for processing a first message;
  (b) controlling the digital switching system to route the first message to the selected one of said first and second message processing units; and
  (c) processing the first message by the selected message processing unit initiating storing and/or retrieving and transmitting the first message; and
  wherein when the first message processing unit stores the first message and the first message processing unit becomes unavailable after the first message is stored by the first message processing unit, step (c) includes the second message processing unit processing the first message by obtaining the first message from the first message processing unit, and a message processing state being transferred from the first message processing unit to the second message processing unit.

36. A method as recited in claim 2, wherein the first message is a voice message.

37. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
(a) selecting, by said control processor, one of said first and second message processing units for processing a first message;
(b) controlling the digital switching system to route the first message to and/or from the selected one of said first and second message processing units; and
(c) processing the first message by the selected message processing unit initiating storing and/or retrieving and transmitting the first message; and
wherein when the first message processing unit stores the first message and the first message processing unit becomes unavailable after the first message is stored by the first message processing unit, step (c) includes the second message processing unit processing the first message by obtaining the first message from the first message processing unit and the second message processing unit includes a message cache for receiving and storing the first message from the first message processing unit and step (c) includes storing the obtained first message in the message cache.

38. A method as recited in claim 2, wherein step (c) includes sending message box information to the selected one of the first and second message processing units processing the first message.

39. A message processing method for a message communication system connected to a telephone switching system, the message communication system including a digital switching system connected to the telephone switching system, at least first and second message processing units connected to the digital switching system, a control processor connected to the digital switching system and said first and second message processing units, said method comprising the steps of:
(a) selecting, by said control processor, one of said first and second message processing units for processing a first message;
(b) controlling the digital switching system to route the first message to and/or from the selected one of said first and second message processing units; and
(c) processing the first message by the selected message processing unit initiating storing and/or retrieving and transmitting the first message; and
wherein several messages are stored and step (c) includes processing message responsive to a list of message storage locations for each user indicating which of said first and second message processing units stores the messages.

40. A method as recited in claim 2, wherein step (c) includes sending a stored message through the digital switching system.

41. A method as recited in claim 40, wherein step (c) includes sending a telephone number of a location to which the stored message is to be sent through the digital switching system to the telephone switching system and detecting an off hook condition at the location.

42. A method as recited in claim 41, wherein in step (c) when the first message processing unit becomes unavailable after the stored message is stored, the second message processing unit obtains the stored message from the first message processing unit, and the digital switching system routes the stored message from the second message processing unit to the location through the telephone switching system after the off hook condition is detected.

43. A message communication system as recited in claim 3, further comprising telephone number storage for storing a telephone number of an external location to which a message can be sent.

44. A message communication system as recited in claim 43, further comprising a message box for each user storing locations of messages for that user.

45. A message communication system as recited in claim 44, further comprising a cache accessible by all users and for storing a broadcast message.

46. A message communication system as recited in claim 1, wherein said first and second message processing means are capable of detecting the first message.

47. A message communication system as recited in claim 1, wherein said first and second message processing means are capable of monitoring and controlling progress of the processing of the first message.

48. A message communication system as recited in claim 1, wherein said first and second message processing means control an order of message processing steps.

49. A message communication system as recited in claim 1, further comprising:
a first communication path connected between said first message processing means and said control means; and
a second communication path connected between said digital switching means and said control means and said control means controlling said digital switching means over said second communication path.

50. A message communication system as recited in claim 1, further comprising a communication path connected to said first message processing means, said second message processing means and said digital switching means and said communication path carries the first message when the first message is transferred between said first and second message processing means.

51. A message communication system as recited in claim 1, wherein said first message processing means comprises a first computer, said digital switching means comprises a digital switching system and said control means comprises a second computer.

52. A voice message communication system connected to a central office switching system, said communication system comprising:
a home voice processing computer, having voice ports, a home message cache and local message storage, detecting, processing, monitoring and controlling voice messages and an order of message processing steps, and sending voice messages to and receiving voice messages from the central office switching system in accordance with message box information, said home processing computer specified as the home for a user's message processing, sending and receiving;
a remote voice processing computer, having voice ports, a remote message cache and local message storage, processing voice message, sending voice message to and receiving voice messages from the central office switching system in accordance with the message box information;
a digital switching system, connected to said home voice processing computer, said remote voice processing computer and the central office switching system, for routing messages between the central office switching system and said processing computers;

a communication path connected to said digital switching system;

a local area network having a data path and having a message path connecting said home voice processing computer and said remote voice processing computer; and a master control computer, connected to said digital switching system via said communication path and to said home and remote voice processing computers via said data path, storing a message box having the message box information for each user, the message box information listing messages for each user, each list entry indicating which of said processing computers stores each user's message where either processing computer can store a user's messages, said master control computer directly controlling processing by and routing of messages to and from said processing computers through said digital switching system in accordance with $P(I) = W1*H(I) + W2*RS(I) + W3*PA(I)$, where I is an index specifying one of said processing computers, W1-W3 are weights, H is an indicator indicating whether the one of said processing computers is the home processing computer, RS is an available amount of the local storage for the one of said processing computers, PA is a number of unoccupied voice ports on the one of said processing computers, and P is a message placement value, the one of said processing computers with the highest placement value being selected for processing, sending and/or receiving the voice messages, the weights being set to route messages for the user to said home processing computer when said home processing computer is available, has at least one unoccupied voice port and has sufficient local storage for the messages, said control computer routing a user's messages to said remote computer when said home computer is not selected, when one of said processing computers stores one of the messages and the other one of said processing computers is selected for processing the one of the messages, the message is transferred over the message path and stored in the respective one of the home and remote message caches for processing by the selected processing computer if the one of said processing computers is unavailable, message processing being transferred to the one of said processing computers from the other one of said processing computers along with changing of the message routing by said digital switching system if the one of the processing computers is available, said master control computer transferring the message box information to the one of the processing computers processing, sending or receiving the messages for the user.

* * * * *

UNITED STATES PATENT AND TRADEMARK OFFICE
CERTIFICATE OF CORRECTION

PATENT NO. : 5,029,199
DATED : July 2, 1991
INVENTOR(S) : Scott Jones et al.

It is certified that error appears in the above-identified patent and that said Letters Patent is hereby corrected as shown below:

On the title page, under Inventors "Donald P. Picard" s/b
--Donald F. Picard--.

Col. 3, line 62, "sWitching" s/b --switching--.
Col. 10, line 12, "ar" s/b --are--.
Col. 21, line 29, after "specified" insert --as--.

Signed and Sealed this

Fourth Day of January, 1994

*Attest:*

BRUCE LEHMAN

*Attesting Officer*     Commissioner of Patents and Trademarks